United States Patent [19]

Matsumura et al.

[11] Patent Number: 4,662,716
[45] Date of Patent: May 5, 1987

[54] LIGHT SPLITTER

[75] Inventors: Susumu Matsumura, Kawasaki; Takashi Suzuki, Yokohama, both of Japan

[73] Assignee: Canon Kabushiki Kaisha, Tokyo, Japan

[21] Appl. No.: 799,283

[22] Filed: Nov. 19, 1985

Related U.S. Application Data

[63] Continuation-in-part of Ser. No. 449,416, Dec. 13, 1982, abandoned.

[30] Foreign Application Priority Data

Dec. 19, 1981 [JP] Japan .............................. 56-205831
Jan. 18, 1982 [JP] Japan ................................ 57-6683

[51] Int. Cl.⁴ .............................................. G02B 27/10
[52] U.S. Cl. ...................................... 350/169; 350/168

[58] Field of Search ............... 350/169, 171, 172, 162, 350/168; 362/31

[56] References Cited

U.S. PATENT DOCUMENTS

2,972,277 2/1961 Siegler, Jr. et al. ................. 350/168
3,521,542 7/1970 De Goerderen ....................... 95/42

Primary Examiner—John K. Corbin
Assistant Examiner—P. M. Dzierzynski
Attorney, Agent, or Firm—Fitzpatrick, Cella, Harper & Scinto

[57] ABSTRACT

Disclosed is a light splitter in which a number of minute inclined surfaces inclined with respect to the surface of a parallel planar glass is formed. At least part of a light beam having entered the light splitter travels while being totally reflected by said surface and said inclined surfaces and the remainder of the light beam travels without being totally reflected by said inclined surfaces.

5 Claims, 14 Drawing Figures

LIGHT SPLITTER

This application is a continuation of application Ser. No. 449,416, filed Dec. 13, 1982, now abandoned.

BACKGROUND OF THE INVENTION

1. Field of the Invention

This invention relates to a light splitter to be used in a light measuring apparatus or an information mark indicating apparatus in an optical device such as a camera or the like.

2. Description of the Prior Art

Figure 1:
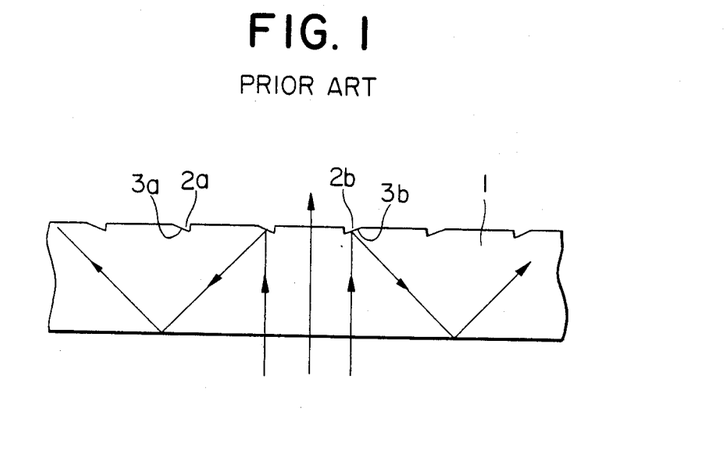
FIG. 1 is a cross-sectional view of a known light splitter.

Various techniques of splitting part of an incident light beam by utilizing a minute concavo-convex structure on the surface of a planar plate are known. For example, FIG. 1 of the accompanying drawings shows the splitter disclosed in U.S. Pat. No. 3,521,542. In this splitter, an incident light beam L is reflected by minute incision structures 2a and 2b on a planar plate 1 provided near the focusing screen of a camera and is directed through an exit end surface to a photodetector, not shown. In this method, however, coating of silver or like material must be formed on the reflecting surfaces 3a and 3b of the incision structures 2a and 2b to provide highly reflective surfaces, and this leads to high cost. Also, in order that the light beam transmitted through the planar plate 1 may be utilized as the finder light beam for the purpose of focusing or composition decision, the reflecting surfaces 3a and 3b must be made very narrow, and it is technically very difficult to make only such minute surfaces into highly reflective evaporated surfaces.

SUMMARY OF THE INVENTION

It is an object of the present invention to eliminate the disadvantage peculiar to the prior art that the highly reflective surfaces as described above are required and to provide a light splitter which is inexpensive and moreover efficient. The gist of the present invention resides in that a number of minute inclined surfaces are provided in the surface of a substrate comprising a transparent parallel planar plate through which a light beam may pass and the angle formed by these inclined surfaces with said surface is set so that at least part of a light beam having entered the light splitter travels while being totally reflected by said surface and said inclined surfaces and the remainder of the light beam travels without being totally reflected by said inclined surfaces.

The invention will become more fully apparent from the following detailed description thereof taken in conjunction with the accompanying drawings.

DESCRIPTION OF THE PREFERRED EMBODIMENTS

FIGS. 2 to 7 show examples in which the present invention is applied to a light splitter for taking out part of an imaging light beam from a picture-taking lens and directing it to a photodetector for light measurement.

Figure 2:
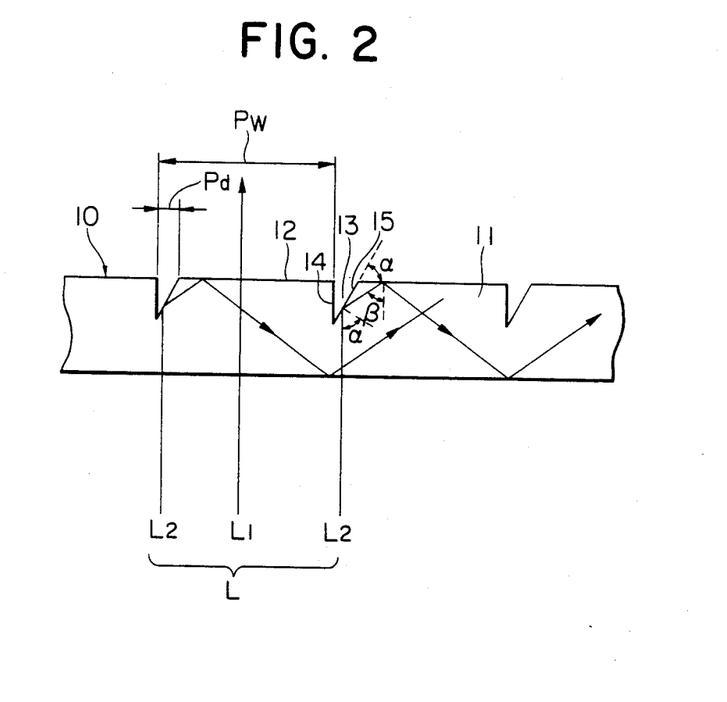
FIG. 2 is a cross-sectional view of a first embodiment of the light splitter according to the present invention.

FIG. 2 is a cross-sectional view of the light splitter 10. The exit side surface of a substrate 11 comprising a transparent parallel planar plate is formed into a minute concavo-convex structure, which comprises a planar portion 12 and wedge-like incisions 13. Each of the incisions 13 has a surface 14 substantially perpendicular to the planar portion 12, and an inclined surface 15 having an inclination $\alpha$ with respect to the planar portion 12. Of the light beam from a picture-taking lens, not shown, the light beam L1 passing through the planar portion 12 travels toward a finder. The light beam L2 incident on the inclined surface 15 is totally reflected by this inclined surface 15 and travels toward the planar portion 12, and is further totally reflected by the planar portion 12 and travels through the substrate 11 while being repetitively totally reflected, and exits into the air from an exit end surface of the substrate 11 and enters a photodetector disposed there.

In order that the above-described total reflections may take place on the inclined surface 15 and the planar portion 12, it is necessary that both the condition for which the incident light is totally reflected by the inclined surface 15 and the condition for which such totally reflected light is totally reflected by the planar portion 12 be established. Accordingly, when the inclination of the inclined surface 15 of the incision 13 is $\alpha$ and the angle of incidence onto the planar portion 12 is $\beta$ and the refractive index of the substrate 11 is n, in order that the former condition may be satisfied, it is required that the following inequality be satisfied:

$$\alpha > \sin^{-1}(1/n) \tag{1}$$

and in order that the latter condition may be satisfied, it is required that the following inequality be satisfied:

$$\beta = 180° - 2\alpha > \sin^{-1}(1/n) \tag{2}$$

Accordingly, from these two inequalities, the following condition must be satisfied:

$$\sin^{-1}(1/n) < \alpha < 90° - (\tfrac{1}{2})\cdot\sin^{-1}(1/n) \tag{3}$$

If the substrate 10 is formed of acrylic material, n=1.492 and therefore, inequality (3) becomes $$42° < \alpha < 69° \tag{4}$$

In FIG. 2, $\alpha$ is shown as $\alpha = 60°$.

Figure 3:
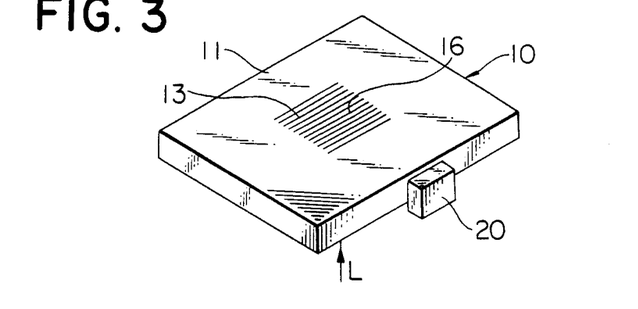
FIG. 3 is a perspective view of the FIG. 2 embodiment.

FIG. 3 shows the relation between the light splitter 10 and the photodetector 20. On the exit side surface of the light splitter 10, there is formed a grating line portion 16 comprising a number of wedge-like incisions 13 arranged side by side, and part of the incident light beam L from the lower entrance side surface may be totally reflected into the substrate 11 by this portion and the totally reflected light may be received by the photodetector 20. The rate of the quantity of light reflected by this grating line portion 16 is substantially determined by a ratio Pd/Pw, where Pw is the spacing between adjacent incisions 13 and Pd is the width of the incisions 13. Accordingly, the quantity of light entering the photodetector 20 depends on the rate of the width of the planar portion 12 to the width of the incisions 13.

On the other hand, the light beam L1 having passed through the planar portion 12 of the light splitter 10 can be utilized as a finder light beam. However, where the light splitter 10 is provided near the focal plane of a single lens reflex camera, the light beam L2 incident on the incisions 13 is directed toward the photodetector 20 by the grating line portion 16 and therefore, if looked in through the finder, the incisions 13 will look shadowed dark. Accordingly, where the light splitter 10 is provided near the focusing screen, the width Pd of the incisions 13 must be made small enough not to be visually recognized in order that the appearance of the finder picture plane may not be injured. Further, it also is desirable that the period Pw of the grating lines be made small enough not to be visually recognized. In ordinary single lens reflex cameras, the period Pw can be 100 $\mu$m or less.

Figure 4:
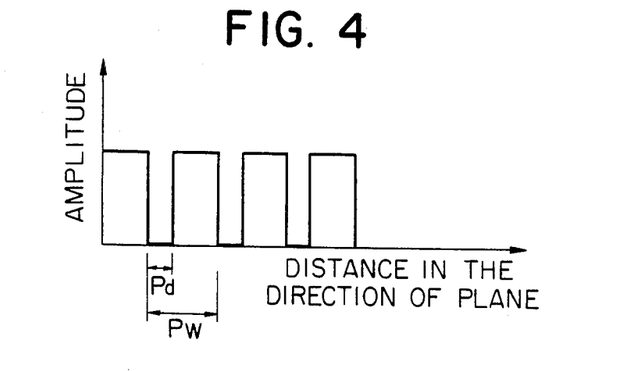
FIGS. 4 and 5 illustrate diffracted lights.
Figure 5:
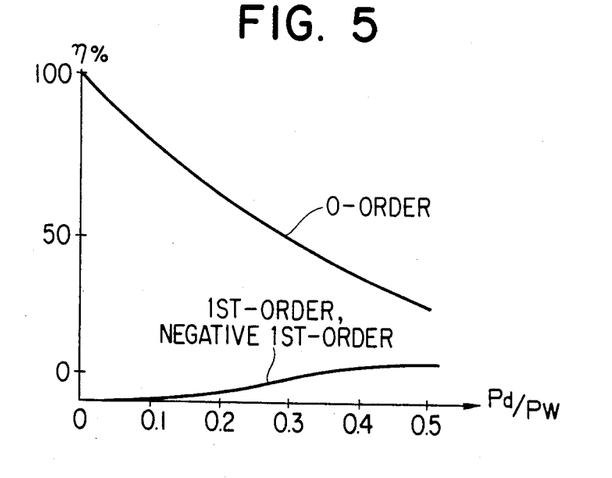

Further, if such minute incisions 13 exist periodically, the transmitted light beam L1 will become subjected to a diffraction effect. The influence of this diffraction effect on the light beam L1 will be considered as follows. When a light beam L comprising a plane wave is incident on the light splitter 10 perpendicularly thereto, the light beam L2 incident on the incisions 13 is all directed to the photodetector 20 by total reflection and therefore, the amplitude distribution of the wave surface immediately after being transmitted through the light splitter 10 can be approximated as shown in FIG. 4 wherein the ordinate represents the amplitude of the transmitted light and the abscissa represents the distance in the direction of plane of the grating line portion 16. Here, if the 0-order diffraction efficiency and the 1st-order diffraction efficiency are calculated for a wavelength of $\lambda=0.55$ $\mu$m with the ratio of Pd/Pw changed, they will be as shown in FIG. 5. It is to be understood that the Nth-order diffraction efficiency $\eta$ of the ordinate is the ratio of the quantity of Nth-order diffracted light to the quantity of incident light and that reflection loss and absorption loss are not taken into account. The 0-order diffracted light is a light transmitted in the same direction as the direction of incidence and this contributes as a proper finder image. The 0-order diffraction efficiency must be at least 70% and from FIG. 5, it is required that Pd/Pw<0.16.

Figure 6:
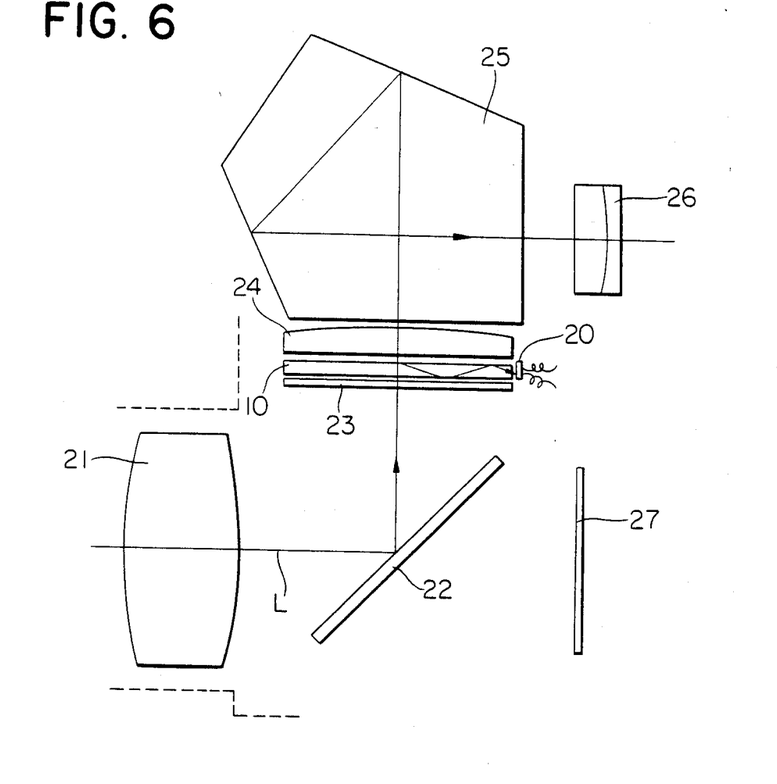
FIG. 6 shows a construction in a case where the light splitter is applied for the light measurement in a single lens reflex camera.

FIG. 6 shows a construction in which the light splitter 10 shown in FIG. 3 is applied to the light measuring device of a single lens reflex camera. The light beam L incident from a picture-taking lens 21 is reflected upwardly by a quick return mirror 22 and, along the light path thereof, there are disposed a focusing screen 23, the light splitter 10 of the present invention, a condenser lens 24, a pentaprism 25 and an eyepiece 26. A film 27 is provided behind the quick return mirror 22. The light splitter 10 disposed between the focusing screen 23 and the condenser lens 24 splits part of the scattered light from the focusing screen 23 and directs it to the photodetector 20. Accordingly, part of the light beam L passed through the picture-taking lens 21 reaches the photodetector 20 at a predetermined ratio and therefore, measurement of the brightness of the light beam L becomes possible and a proper exposure of the camera can be determined. The position at which the light splitter 10 is installed when it is utilized as the light measuring device of a single lens reflex camera is not restricted to the position shown in this embodiment, but may be near the eyepiece 26, near the pentaprism 25 or between the condenser lens 24 and the pentaprism 25.

In the light splitter 10 as shown in FIG. 3, the grating line portion 16 exists only in the central portion thereof and thus, only the central portion of the picture plane is metered and partial metering can be realized. Of course, if the grating line portion is provided on a larger area portion of the surface of the light splitter 10, average metering will become possible. Also, in this light splitter 10, the ratio of quantity of split light entering the photodetector 20 is determined and therefore, by changing this ratio from part to part of the grating lines of the light splitter 10, it is possible to provide a desirable metering distribution characteristic.

Figure 7:
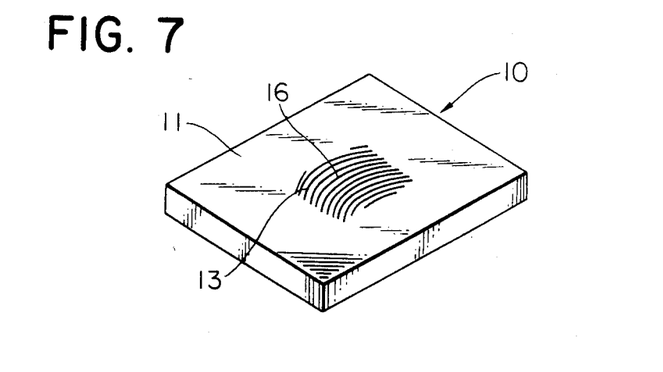
FIG. 7 is a perspective view showing a modification of the FIG. 2 light splitter.

FIG. 7 shows a modification of the light splitter 10 in which each of the incisions 13 forming the grating line portion 16 has a curvature centered at the vicinity of the photodetector. Accordingly, reflected light can be effectively condensed even when a photodetector having a small light-receiving area such as a silicon light-receiving element is used.

As hitherto described, the light splitter according to the present embodiment is an improvement over the known light splitter and can be manufactured by a simple process and moreover, can split a light beam efficiently. Particularly, if a synthetic resin material is employed for the transparent optical member which provides a substrate, it will be possible to manufacture a great quantity of light splitters as shown in FIGS. 3 and 7 at low cost from a metal mold having a minute concavo-convex structure.

Description will now be made of a second embodiment of the present invention. The second embodiment is one in which the light splitter of the present invention is applied to an information mark indicating apparatus.

Figure 8:
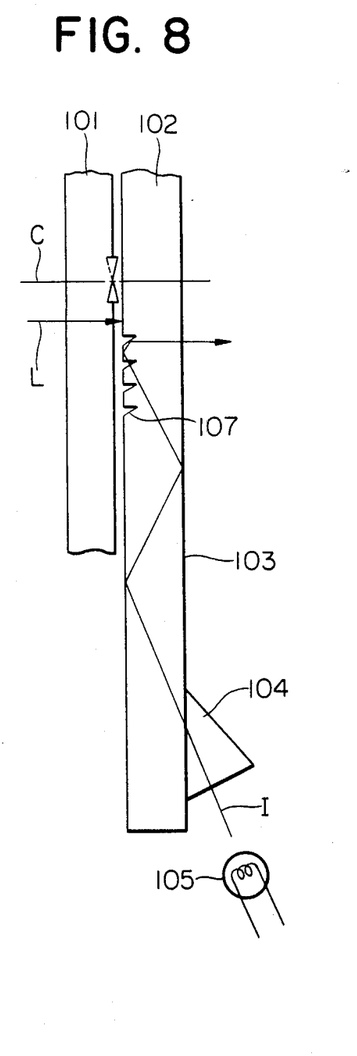
FIG. 8 is a cross-sectional view of a second embodiment of the present invention.

FIG. 8 shows a cross section of the finder of a cine-camera near the focusing screen thereof. From the incidence side of a finder light beam L, a focusing screen 101 having a split image range finder and an information mark indicating member 102 having pattern information on the surface thereof are arranged adjacent to each other and substantially perpendicularly to the finder optical axis C. A prism 104 is adhesively secured to the exit surface 103 of the information mark indicating member 102 at a position thereof deviated from the optical axis C so that the illuminating light I from a light source 105 comprising a tungsten lamp or LED may enter the information mark indicating member 102 through the prism 104. In the entrance surface 106 of the information mark indicating member 102 on which the finder light beam I is incident, a plurality of wedge-like incisions 107 are formed in the form of a grating in a direction substantially orthogonal to the direction of the light source 105, and the aggregate of these incisions 107 represents an information pattern. Each incision 107, as enlargedly shown in FIG. 9, has a surface 108 substantially perpendicular to the entrance surface 106 of the information mark indicating member 102, and an inclined surface 109 having an inclination $\alpha$ with respect to the entrance surface 106. The illuminating light I having entered the information mark indicating member 102 from the light source 105 through the prism 104 travels through the information mark indicating member 102 while being repetitively totally reflected, passes through the incision 107, is totally reflected by the entrance surface 106 immediately in front of the incision 107 and travels toward the inclined surface 109, and is further totally reflected by the inclined surface 109 and exits from the exit surface 103 of the information mark indicating member 102 in a direction substantially perpendicular thereto, and finally reaches the eye of the observer who looks in through the finder window. The light which exits from the information mark indicating member 102 need not always exit in the direction perpendicular to the exit surface 103 but may exit at an angle which will enable the light to enter the observer's eye. In a popular finder optical system, the exit angle may be of the order of 20°.

Figure 9:
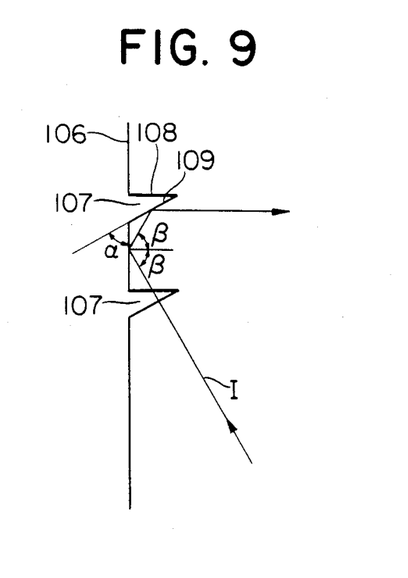
FIG. 9 illustrates the incision structure of FIG. 8.

In order that the above-described total reflections may take place, it is necessary that both the condition for which the illuminating light I is totally reflected on the entrance surface 106 and the condition for which this totally reflected light is totally reflected by the inclined surface 109 be established. Accordingly, when the inclination of the inclined surface 109 of each incision 107 is $\alpha$ and the angle of incidence of the illuminating light I onto the entrance surface 106 is $\beta$ and the refractive index of the information mark indicating member 102 is n, in order that the former condition may be satisfied, it is required that the following inequality be satisfied:

$$\beta = 180° - 2\alpha > \sin^{-1}(1/n) \tag{5}$$

and in order that the latter condition may be satisfied, it is required that the following inequality be satisfied:

$$\alpha > \sin^{-1}(1/n) \tag{6}$$

Accordingly, from these two inequalities, the following condition must be satisfied:

$$\sin^{-1}(1/n) < \alpha < 90° - (\tfrac{1}{2}) \cdot \sin^{-1}(1/n) \tag{7}$$

If the information mark indicating member 102 is formed of acrylic material, n=1.492 and therefore, inequality (3) becomes $$42° < \alpha < 69° \tag{8}$$

In FIG. 9, $\alpha$ is shown as $\alpha = 60°$.

Figure 10:
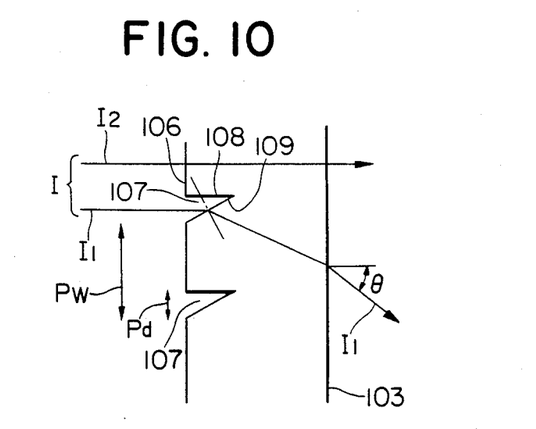
FIG. 10 illustrates the light path of the finder light beam.

Considering the influence of the incisions 107 on the finder light beam I, as shown in FIG. 10, of the finder light beam I from an object which has reached the information mark indicating member 102, the light beam I1 entering the incision 107 is refracted by the inclined surface 109 thereof and the exit surface 103 of the information mark indicating member 102 and as a whole, it is refracted by an angle $\theta$ with respect to the finder optical axis C. This angle $\theta$ is about 38.2° if the refractive index n of the information mark indicating member 102 is 1.492 and the inclination $\alpha$ of the inclined surface 109 is 60°. This leads to an undesirable possibility that the incisions 107 are seen as dark lines in the finder of usual state. To prevent this, it is desirable that the grating structure be made fine to such a degree that it cannot be resolved by the eye. If this is done, the incisions 107 will look merely averagely dark and no dark line structure will be recognized. If this is mathematically expressed, when the spacing between adjacent incisions 107 is Pw and the width of the incisions 107 is Pd, the object image will be seen as shadowed at the ratio of Pd/Pw in those portions of the object image seen through the finder which correspond to the incisions 107. In an ordinary single lens reflex camera, it is desirable that the width Pd be 100 $\mu$m or less and, in the case of a cinecamera, it is desirable that the width Pd be 10 $\mu$m or less.

Figure 11:
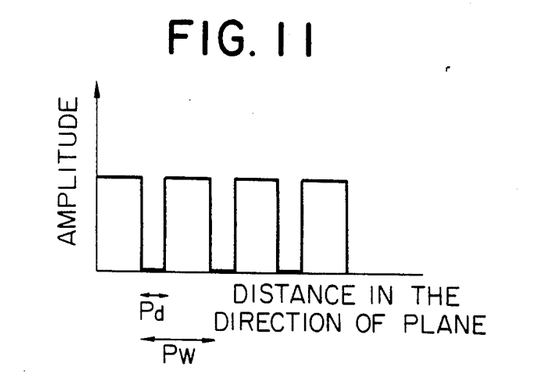
FIGS. 11 and 12 illustrate the diffraction of the finder light beam.
Figure 12:
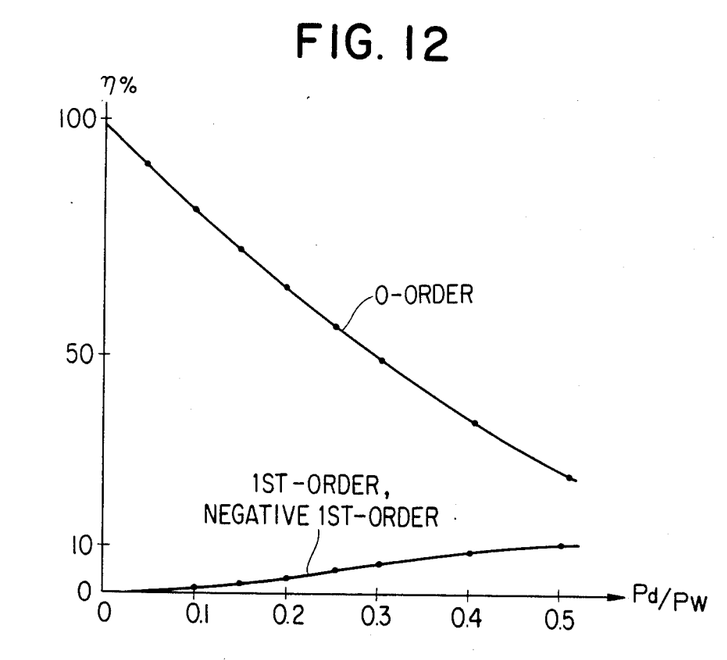

Further, if such minute incisions 107 exist periodically, the finder light beam I will be subjected to a diffraction effect. The influence of this diffraction effect on the light beam I will hereinafter be considered approximately. When the finder light beam I comprising a plane wave enters the information mark indicating member 102 perpendicularly thereto, the light beam I2 having entered the entrance surface 106 having no incision 107 travels rectilinearly, while the light beam I1 having entered the incision 107 is refracted as previously described and therefore, the amplitude distribution of the wave surface immediately after having been transmitted through the information mark indicating member 102 can be approximated as shown in FIG. 11 wherein the ordinate represents the amplitude of the transmitted light and the abscissa represents the distance in the direction of plane of the information mark indicating member 102. If the 0-order, 1st-order and negative 1st-order diffraction effects are calculated for a wavelength of $\lambda = 0.55$ $\mu$m with the ratio of Pd/Pw changed, they will be as shown in FIG. 12. The Nth-order diffraction efficiency $\eta$ of the ordinate is the ratio of the quantity of Nth-order diffracted light to the quantity of incident light, and it is to be understood that reflection loss and absorption loss are not taken into account. The 0-order diffracted light is a light transmitted in the same direction as the direction of incidence and this contributes as a proper finder image. The 0-order diffraction efficiency must be at least 70% and from FIG. 12, it is required that Pd/Pw<0.16.

Figure 13:
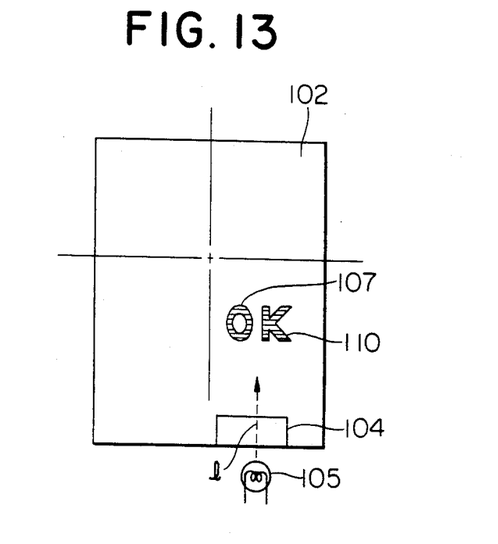
FIGS. 13 and 14 are front views of information mark indicating members.

FIG. 13 is a view of the information mark indicating member 102 as seen from the front thereof. Only within a pattern 110 to be indicated which is provided on the entrance surface 106 of the information mark indicating member 102, plural rows of incisions 107 are provided in a direction orthogonal to the illuminating light I from the light source 105. Accordingly, the illuminating light I from the light source 105 enters the information mark indicating member 102 through the prism 104, and further impinges upon each incision 107 in the pattern 110 and is totally reflected thereby and reaches the observer's eye and thus, the pattern 110 is seen as shining brightly.

Figure 14:
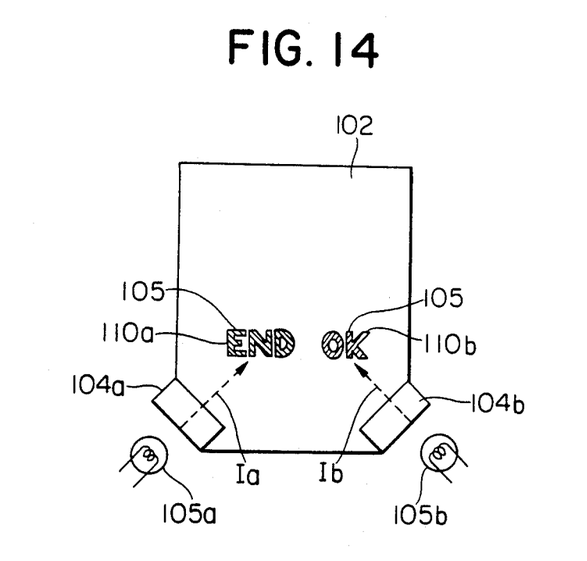

FIG. 14 shows a case where there are two patterns to be indicated. In this case, two light sources 105a, 105b and two prisms 104a, 104b are disposed at two corners, respectively, of an information mark indicating member 102, and the grating lines of incisions 107 in the two patterns 110a, 110b to be indicated are arranged so as to be orthogonal to the directions of travel of the illuminating lights Ia, Ib from the respective light sources 105a, 105b. Accordingly, when the illuminating lights Ia and Ib are applied alternatively or simultaneously from the light sources 105a and 105b, there is obtained indication of the desired display pattern 110a or 110b or both.

As described above, the information mark indicating apparatus according to the present embodiment can very simply and inexpensively indicate a display pattern on the finder picture plane merely by applying an illuminating light to a grating line structure comprising a plurality of wedge-like incisions provided in the entrance surface of the information mark indicating member which is an optically transparent body, on which entrance surface the finder light beam is incident.

What is claimed is:

1. A light splitter comprising:
   a transparent planar substrate having an entrance surface, an opposed exit surface and an exit end surface; and
   a number of minute inclined surfaces provided in said exit surface, the angles of said inclined surfaces with respect to said exit surface being set to satisfy the following condition:

$$\sin^{-1}(1/n) < \alpha < 90° - (\tfrac{1}{2})\sin^{-1}(1/n)$$

where $\alpha$ is the inclination of said inclined surfaces and n is the refractive index of said substrate, so that at least part of a light beam which is transmitted through said entrance surface toward said exit surface exits through said exit surface while another portion of the light beam is totally reflected by said inclined surfaces toward said exit surface, is then further totally reflected by said exit surface and thereafter exits through said exit end surface.

2. A light splitter according to claim 1, satisfying the following condition:

$$Pd/Pw \leq 0.16$$

where Pw is the spacing between said inclined surfaces and Pd is the width of said inclined surfaces in the direction of the plane of said substrate.

3. A light splitter according to claim 1, wherein the continuous portion of incisions or projections forming said inclined surfaces has a curvature.

4. A light splitter comprising:
   a transparent plane substrate having a front surface and back surface; and
   minute inclined surfaces formed in the front surface of said transparent planar substrate, the angles formed by said inclined surfaces with said front surface being set to satisfy the following condition:

$$\sin^{-1}(1/n) < \alpha < 90° - (\tfrac{1}{2})\sin^{-1}(1/n)$$

where $\alpha$ is the inclination of said inclined surfaces and n is the refractive index of said substrate, so that at least part of a light beam travelling in the transparent planar substrate while being totally multiply reflected by the front and back surfaces is totally reflected by said inclined surfaces to exit from said back surface out of said transparent planar substrate.

5. A light splitter accoring to claim 4, satisfying the following condition:

$$Pd/Pw \leq 0.16$$

where Pw is the spacing between said inclined surfaces and Pd is the width of said inclined surfaces in the direction of the plane of said substrate.

* * * * *

UNITED STATES PATENT AND TRADEMARK OFFICE
CERTIFICATE OF CORRECTION

PATENT NO. : 4,662,716  
DATED : May 5, 1987  
INVENTOR(S) : SUSUMU MATSUMURA, ET AL.

It is certified that error appears in the above-identified patent and that said Letters Patent is hereby corrected as shown below:

On the Title Page:

<u>AT [56] UNDER REFERENCES CITED/U.S. PATENT DOCUMENTS</u>

Line 2,    "De Goerderen" should read --De Goederen--.

<u>COLUMN 2</u>

Line 51,   "(1/n" should read --(1/n)--.  
    Line 58,   "10" should read --11--.

<u>COLUMN 3</u>

Line 9,    "rate" should read --ratio--.  
    Line 17,   "in" should read --at--.  
    Line 41,   "of plane" should read --of the plane--.

<u>COLUMN 4</u>

Line 58,   "I" should read --L--.

<u>COLUMN 6</u>

Line 25,   "of plane" should read --of the plane--.

UNITED STATES PATENT AND TRADEMARK OFFICE
CERTIFICATE OF CORRECTION

PATENT NO. : 4,662,716

DATED : May 5, 1987

INVENTOR(S) : SUSUMU MATSUMURA, ET AL,

It is certified that error appears in the above-identified patent and that said Letters Patent is hereby corrected as shown below:

COLUMN 8

Line 8,  "plane" should read --planar--.
Line 23, "accoring" should read --according--.

Signed and Sealed this

Fifteenth Day of December, 1987

Attest:

DONALD J. QUIGG

Attesting Officer          Commissioner of Patents and Trademarks